Dec. 19, 1961  F. J. JENNY  3,013,876
METHOD FOR REDUCING ORES AND PRODUCING SYNTHESIS GAS
Filed Feb. 27, 1958
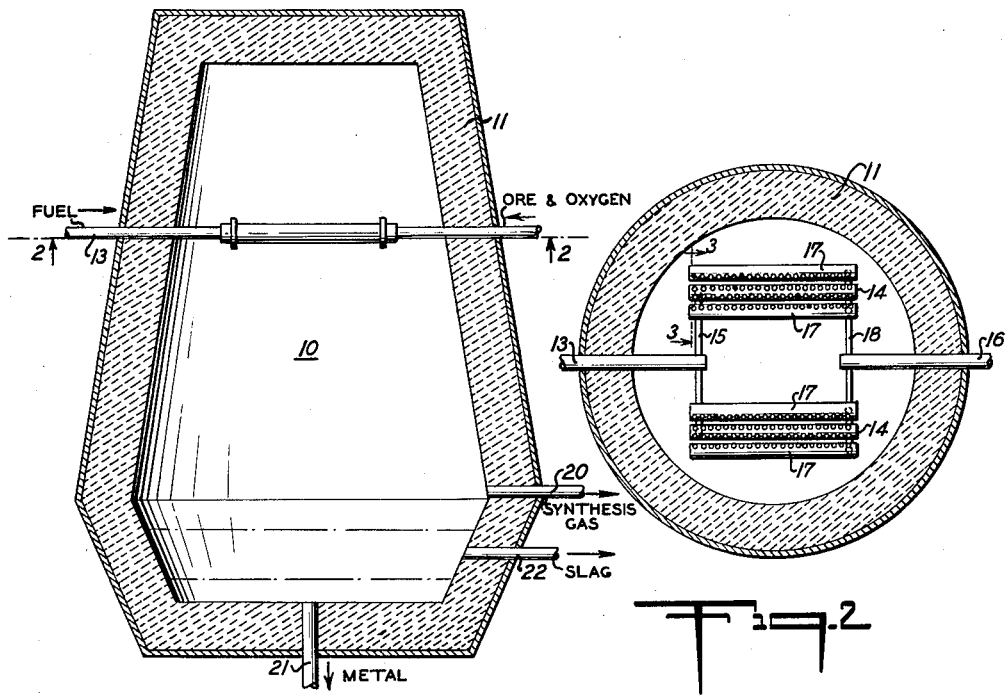
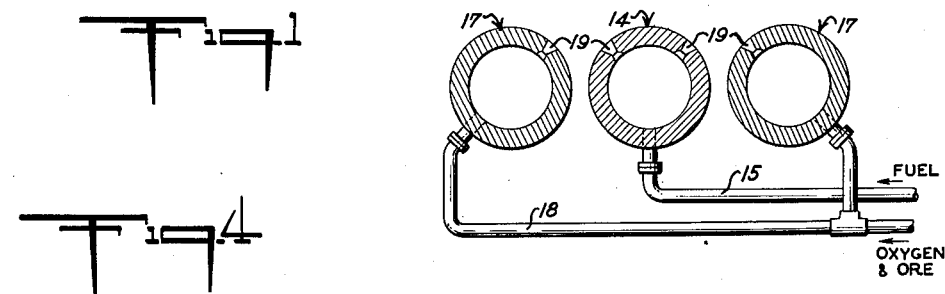
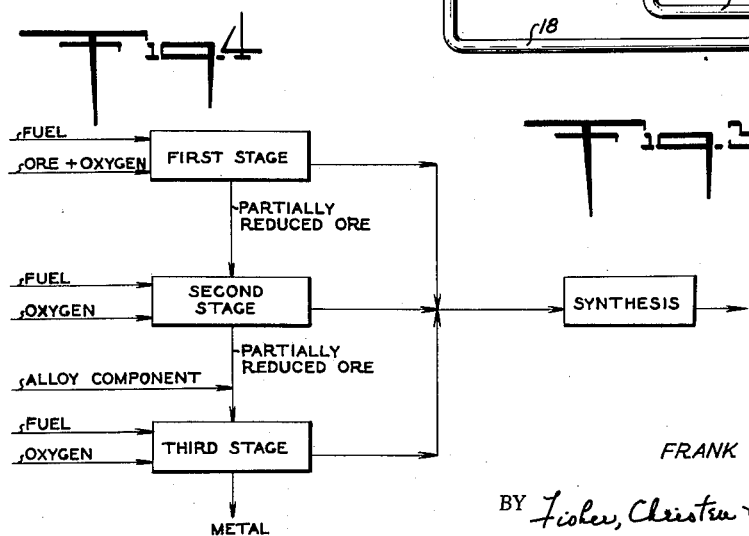
INVENTOR
FRANK J. JENNY
BY *Fisher, Christen & Goodson*
ATTORNEYS

United States Patent Office 3,013,876
Patented Dec. 19, 1961

---

3,013,876
METHOD FOR REDUCING ORES AND PRODUCING SYNTHESIS GAS
Frank J. Jenny, 460 W. 24th St., New York 11, N.Y.
Filed Feb. 27, 1958, Ser. No. 717,854
14 Claims. (Cl. 75—26)

The present invention relates to a novel method for the reduction of oxides and the preparation of synthesis gas. It is particularly adapted to the direct reduction of iron ore to form sponge iron.

The production of sponge iron by the reduction of iron oxides with reducing gases comprising CO and $H_2$ is well known to the art. A small scale commercial process was adapted to continuous operation in Sweden as early as 1941. This process uses a shaft furnace in which the ore is reduced by counter-current flow with a high $CO/H_2$ gas at a temperature of about 1800° F. The reducing gas is constantly regenerated by converting the $CO_2$ and $H_2O$ products of the reduction reaction with carbon in an electric carburettor using charcoal.

There are a number of patents in the art disclosing various methods for the direct reduction of iron ore. Thus, Patent Number 2,752,234, issued July 7, 1955, discloses a Process for the Continuous Gaseous Reduction of Iron Ore in a Fluidized Bed System.

In these and similar methods, the process of reducing the ore to sponge iron may be represented by the chemical equations $$Fe_2O_3 + 3CO = 2Fe + 3CO_2 \quad (Eq.\ 1)$$
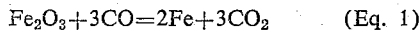
$$Fe_2O_3 + 3H_2 = 2Fe + 3H_2O \quad (Eq.\ 2)$$
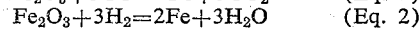

The reaction with CO is exothermic; that with $H_2$ is endothermic. At a typical operating temperature, the exothermic heat with CO is about 70 B.t.u.'s per pound of Fe; the endothermic heat with $H_2$ is about 400 B.t.u.'s per pound of Fe. Thus, in general, the overall reaction is an endothermic one depending upon the composition of the reducing gas. The heat of reaction is an important factor to be considered in the design of a commercial process, particularly in view of the thermodynamic equilibrium factors that must also be taken into account.

With respect to equilibrium considerations, it is well known that the controlling reaction is the reduction of FeO to Fe which follows the reduction of $Fe_2O_3$ to FeO. Thus the ratio of CO to $CO_2$ must be maintained at about 2.5 to 1 or higher at an operating temperature of 1800° F. to permit the reducing reaction to proceed to completion at that temperature. In a similar manner at 1800° F., the ratio of $H_2$ to $H_2O$ must be maintained at about 1.3 to 1 or higher to permit the reducing reaction to proceed to completion. The minimum ratios required vary with the actual temperature of reduction.

In supplying the heat of reaction plus other process heat requirements, substantial quantities of $CO_2$ and $H_2O$ are added to the system in such cases where direct combustion techniques are adapted. Correspondingly, there is an increase in the quantity of reducing gas components which are required to maintain favorable equilibrium conditions for reduction.

Generally, these considerations add up to the fact that for efficient utilization of the reducing gas components, very high recycle ratios are required to satisfy the requirements of equilibrium in maintaining a suitable reducing atmosphere.

Many attempts have been made to develop a satisfactory commercial process for the direct reduction of iron ore to sponge iron and to steel. Thus far, these processes have not developed beyond the exploratory stage, at least in the United States of America.

The present invention discloses a simple and direct method for the reduction of oxides, particularly metallic oxides comprising the classification of iron ore and the like. The process applies to other oxides such as silica, tungsten oxides, nickel oxides, alumina, and others—and includes precursors of oxidic compounds such as carbonates, hydrates, and silicates. These precursors may often be readily converted to oxides by application of heat. The process may also be applied to ores containing uranium and other nuclear energy values. Some of these oxides are known to incorporate carbonaceous components.

The process is a development that extends from another invention as disclosed in my co-pending application Number 305,940, filed August 23, 1952, for the generation of synthesis gas. Synthesis gas is a mixture comprising CO and $H_2$ and is therefore suitable as a reducing gas as previously disclosed. The generation of synthesis gas may be represented by the chemical equation $$CH_4 + \tfrac{1}{2}O_2 = CO + 2H_2 \quad (Eq.\ 3)$$
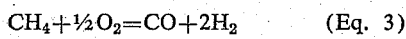

As pointed out in my co-pending application, the generation of CO and $H_2$ is a far more complicated mechanism than that represented by a simplified chemical reaction. At the reaction temperature, which may be about 1800° F. or higher up to 3500° F., oxygen has an exorbitant affinity for reaction with hydrocarbons, resulting in complete oxidation reactions of portions of the hydrocarbon. The complete oxidation reactions are accompanied with excessively large heat releases which have been the cause of incessant apparatus failures and intolerable operating conditions. These failures are corrected in my co-pending application by jetting unconfined streams of hydrocarbon and oxygen together over an extended area of contact, thus permitting the reaction to proceed in accordance with Eq. 3. Equation 3 has a relatively low exothermic heat of reaction amounting to 10,000 B.t.u. per mol of $CH_4$. The process is adaptable to any type of carbonaceous fuel.

In the present invention, I may, for the purpose of illustration, combine the partial oxidation Eq. 3 with the direct reduction Equations 1 and 2 to obtain $$Fe_2O_3 + CH_4 + \tfrac{1}{2}O_2 = 2Fe + CO_2 + 2H_2O \quad (Eq.\ 4)$$
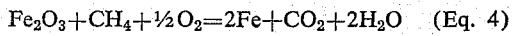

In order to maintain a proper reducing atmosphere, I may recycle excess CO and $H_2$ to the process. Or I may elect to generate additional CO and $H_2$ by the partial oxidation of additional $CH_4$, or of other carbonaceous fuel. Since the net heat of reaction is generally endothermic, I may supply additional heat for reaction and for other heat balance requirements by supplemental total oxidation reactions.

In substance, therefore, I adopt the inventive concepts of my co-pending application for the generation of synthesis gas to the concepts of direct reduction of metallic oxides. Thus, I am enabled to disclose a new and novel method for the direct reduction of iron ore to sponge iron. Also, by operating the process at a temperature above the melting point of the metal, I am enabled to produce refined metal directly. The melting point of iron is 2795° F. Thus, the melting point may be as low as about 2000° F., depending upon the amount of carbon retained in the iron. As in the generation of synthesis gas, operating pressure is not critical and is determined on the basis of economic considerations.

In the process I may add alloying constituents such as boron, manganese, nickel, chromium, rare earth metals and the like which impart improved qualities such as high tensile strength to the finished product. These constituents may be added in any suitable compound form. Also, I may add limestone and other components for desired purposes in accordance with practices well known to the steel industry.

There is another important aspect of the process.

When I choose to produce additional synthesis gas to maintain a suitable reducing atmosphere, I find that very substantial economies are effected in combining the direct reduction process with a synthesis process, such as a process for the synthesis of hydrocarbons as disclosed in another co-pending application number 410,100 filed February 15, 1954, now Patent No. 2,852,545, issued January 20, 1958. In this manner, I avoid the burden of recycling large volumes of synthesis gas or reducing gas to the direct reduction step. I thereby greatly simplify the direct reduction process and in so doing, am enabled to effect very substantial process economies.

Accordingly, it is an object of my invention to reduce oxides including metallic oxides by reaction with a carbonaceous fuel and an oxygen containing gas in a new and novel method.

It is an object of my invention to produce steel directly by an improved method for the direct reduction of iron ore.

It is a further object of my invention to combine the direct reduction process with a synthesis process—such as hydrocarbon synthesis—in a simple, efficient and economic manner.

These and other objects will be evident in the discussions which follow.

Many attempts have been made to produce steel directly from iron ore by combustion techniques. One such method is disclosed in Patent No. 2,745,734, issued May 15, 1956, for a Metal Reduction and Combustion Process.

I have found that the combustion processes for direct reduction are penalized by the same generalized factors that in the past have caused failures in the processes for generating synthesis gas. These failures result from the excessive affinity of oxygen in causing total oxidation reactions to occur when it is intended that the combustion reaction should be limited primarily to partial oxidation. The high exothermic heat of the total oxidation reaction results in excessively high localized temperatures which, in turn, cause failures due to burn-outs. These factors which are well known to the petroleum industry are brought to light in a publication of the American Chemical Society, entitled Progress in Petroleum Technology, Advances in Chemistry, Series No. 5 (1951). Reference is made to pages 122–3 to the chapter on Generation of Synthesis Gas.

In applying my process to the direct reduction of oxides, I have the choice of selecting from several variables of operation.

FIG. 1 is a cross section in elevation of a shaft furnace adapted to produce sponge iron or refined metal.

FIG. 2 is a cross section taken on line 2—2 of FIG. 1. With this burner construction, and suitable modifications thereof, the operating hazards which are caused by the excessive affinity of oxygen for carbonaceous fuels and which in the past have led to repeated failures are avoided.

FIG. 3 shows a detail of the reactant jets of FIG. 2 taken at section 3—3 of FIG. 2.

FIG. 4 is a diagrammatic representation of a multistage process modification of my method which also incorporates a hydrocarbon synthesis step.

In accordance with my co-pending application, the reducing gas may be generated from any type of carbonaceous fuel, including solid, liquid and gaseous carbonaceous fuels. With gaseous fuels, the partial oxidation reaction is a mildly exothermic reaction. With liquid and solid fuels, there is a more substantial exothermic heat of reaction so that as a matter of general practice, steam or carbon dioxide may serve as a partial substitute for free oxygen according to the reactions $$C+H_2O=CO+H_2 \quad \text{(Eq. 4)}$$
$$C+CO_2=2CO \quad \text{(Eq. 5)}$$

The extent to which these reactions are adapted to the process is a matter of process economics, as is well known in the art. The $H_2O$ and/or $CO_2$ may be derived from any suitably available source.

In applying my process, I prefer to use oxygen of high purity, generally in the range of 90–98%. The presence of nitrogen in substantial quantities is usually found to place an excessive economic burden on the heat and material balances of the process. Frequently, however, it is desirable to use enriched air, such as air containing in excess of 40% oxygen. When enriched air is used, the combination process herein disclosed may be adapted to ammonia synthesis as a substitute for the hydrocarbon synthesis step generally contemplated. Also it is to be noted, as is well known in the steel industry, that the incorporation of nitrogen in steel, which results from the relatively low concentrations of $N_2$ in the reducing gas, is beneficial with respect to enhancing properties of the refined metal.

With specific reference to the illustrations, FIGS. 1–3 disclose a method of adapting my process to a shaft type furnace 10, having a refractory lining 11, which is generally analagous to a blast furnace. It is to be understood that the specific type of reactor in which the reduction process is carried out is not a part of the present invention.

Fuel is admitted through line 13 to burner pipe 14 through header 15. The oxide and oxygen are admitted through line 16 to burner pipes 17 through header 18. The reactants, preferably preheated for economy of operation, are thus injected in a plurality of streams at high velocity into the unconfined reaction zone of the furnace through the openings 19 in the burner pipes where they are mixed over an extended area of contact under conditions of extreme turbulence.

The products of reaction flow downward, with the sponge iron or refined metal accumulating at the base of the shaft for discharge at 21 to other process equipment. When the furnace is operated above the melting point of iron, two draw-off connections may be provided—one for the molten metal at 21, the other for slag at 22. Excess reducing gas, together with the $CO_2$ and $H_2O$ formed in the reduction process, is withdrawn through a suitable nozzle 20, near the base of the shaft. The gas outlet connection may be provided with a suitable means such as a de-mister (not shown) to minimize entrainment of solids in the exit gas.

If desired, the exit gas may be passed through a gas plant to remove $H_2O$ by condensation and to remove $CO_2$ by suitable absorption techniques. The purified reducing gas may then be recycled to the shaft furnace to maintain a proper reducing atmosphere as required.

This apparatus is an adaptation of one of the specific means disclosed in my co-pending application for the generation of synthesis gas. In the present adaptation, finely divided ore is admixed with the free oxygen containing gas and the combined "oxidizing" reactants are jetted against the carbonaceous fuel over an extended area of contact as shown. The carbonaceous fuel is converted under reaction conditions to a mixture comprising CO and $H_2$. Correspondingly, a portion of the CO and $H_2$ reacts with the metal oxide in accordance with the reduction reactions. The excess of CO and $H_2$ generated by the partial oxidation reaction provides a suitable reducing atmosphere for the reduction reactions to proceed.

It must be remembered that FIGS. 1–3 represent a specific means for carrying out my reaction process but the illustration is not to be considered limiting. Other arrangements are possible as will be obvious from the considerations at hand. Thus, the iron ore may be introduced separately to the shaft furnace by a suitable extension of the apparatus means shown. In this modification, a recycle CO—$H_2$ gas may be used as a transport gas for introducing the iron ore into the reaction zone. Also, separate provision may be provided for recycling CO and H₂ as desired. Other apparatus to effect jetting of the reactants together at high velocity over an extended area to mix under highly turbulent conditions may be used.

FIG. 4 is a process modification showing the combined features of reduction and synthesis. In FIG. 4, the reduction phase is indicated schematically as a 3-step adaptation with reducing gas being generated in parallel and the reduction process carried out in series. Following the reduction phase, the unconverted reducing gas as synthesis gas passes to a hydrocarbon synthesis phase for the conversion of the excess reducing gas to hydrocarbons including premium high-octane gasoline, petrochemicals and oxygenated hydrocarbons.

In the reducing phase, the iron ore is reduced about 35% in the first stage. It is further reduced from about 35 to 70% in the second stage, with the balance of the reduction occurring in the third stage. The first two stages may be operated at a relatively low temperature of 1800° F., whereas the third stage may be operated at about 2800° F. or higher to produce refined metal. Also, in the third stage, alloying components such as manganese, boron, chromium, nickel and the like may be added to the process in a suitable manner to impart improved properties such as high tensile strength, resistance to corrosion, etc., to the refined metal. It is also understood that other components may be added to the process, such as limestone, in accordance with practices well known in the steel industry. Generally, the refined metal will contain silicon derived from silica contained in the iron ore.

In FIG. 4, the excess reducing gas passes directly to a hydrocarbon synthesis process. This process, as stated previously, may incorporate a reactor of the general design shown in my co-pending application Serial Number 410,100, now Patent 2,852,545, issued September 16, 1958.

By combining the direct reduction process with the hydrocarbon synthesis process, I am thereby enabled to effect very substantial economies in the overall process techniques involved. The end products of both phases of my process are in very substantial demand. It is well known that there is a progressive increase in demand each year for new supplies of high quality steel and for premium quality fuels as well as for petrochemicals. Thus, the combination of the two processes into a common process in the manner disclosed is one of substantial utilitarian and economic merit.

As a "specific illustration" of my process to teach others the art of practicing my invention, the quantity of reducing gas required for the production of one ton of iron is approximately 20,000 standard cubic feet of reducing gas. In generating excess synthesis gas to maintain a suitable reducing atmosphere in the reaction zone, I may prefer to generate a total of about 60,000 s.c.f. of reducing gas per ton of iron, thereby maintaining a 2:1 ratio of reducing gas components to sustain the reducing reactions. This leaves a net of 40,000 s.c.f. of synthesis gas for subsequent conversion. This quantity of synthesis gas will produce in my synthesis process a minimum of one barrel of high-octane gasoline plus about 60 pounds of oxygenated hydrocarbons, comprising mostly ethyl alcohol and including other alcohols, acids and aldehydes. Other factors relating to quantities of carbonaceous fuel, oxygen, etc. are a function of heat and material balances. It is understood that such heat and material balances are a prerequisite in the knowledge of anyone skilled in the art in practicing the present invention.

A supplementary note is added herein with respect to equilibrium gas compositions. As is well known to the art, at temperatures above 1500° F. there is an oxygen transfer or shift reaction which favors the formation of CO. Thus, $$CO_2 + H_2 \rightleftharpoons CO + H_2O \quad \text{(Eq. 6)}$$

It is understood that the proper considerations with respect to this shift reaction as it affects equilibrium gas compositions are inherently included in the present disclosure.

The prior discussions have stressed the fundamental importance of heat balances in the process techniques as herein disclosed. Although not a part of the present application, it is nevertheless anticipated that nuclear energy may also be adapted to the disclosures herein made, and also to suitable modifications thereof. Thus, the availability of radiation energy in supplying heat of reaction permits further improvements which may generally be represented by the equation $$Fe_2O_3 + CH_4 \xrightarrow{N.E.} 2Fe + CO + 2H_2 \quad \text{(Eq. 7)}$$

For comparison purposes, reference is made to prior Eq. 3. As in the present disclosure, any type of carbonaceous fuel is also adaptable with the use of nuclear energy.

*Example*

One and one-half tons/hr. of preheated haematite (Fe₂O₃), 24,000 s.c.f./hr. methane preheated and 18,000 s.c.f./hr. of 95% oxygen were reacted in a single stage furance shown in FIGS. 1–3 operated at 100 p.s.i. The furnace had an average diameter of 4 feet and was 14 feet tall. The reaction temperature was 2300° F. The product was a low oxygen iron having 90% of its combined oxygen removed, on the basis of the haematite. 40,000 s.c.f. excess synthesis gas were produced.

The molar ratio of the reactants must be such as to yield a substantial excess of reducing gas. A minimum of about 1.5 mols synthesis gas to metal oxide is necessary, but it is preferred to operate in the neighborhood of about 2:1 or higher. With respect to the carbonaceous fuel and oxygen, it is necessary to provide somewhat more than stoichiometric amount of oxygen to convert all the carbon to CO, but substantailly less than that required to convert all the carbon to carbon dioxide. It has been found that oxygen ratios of about 1.0 to 1.5, based on the oxygen required to convert the carbon to CO are effective.

While the specific illustrations of the process are directed to reduction of iron oxides, it is to be understood that the process is equally effective with ores of nickel and cobalt and to difficultly reducible oxides such as alumina, silica, tungsten oxides, tetania and the like. The term metal oxide is intended to include such oxides. The term reduced metal oxides is intended to include metals and partially reduced metal oxides.

This application is a continuation-in-part of my co-pending application Serial Number 305,940, filed August 23, 1952, now abandoned.

While the invention has been described in terms of certain examples, such examples are to be considered illustrative rather than limiting, and it is intended to cover all modifications and embodiments that fall within the spirit and scope of the appended claims.

I claim:

1. A process for preparing synthesis gas and reducing metal oxides comprising dispersing a powdered solid metal oxide in a stream of oxidizing gas, injecting said mixture into an unconfined reaction zone in a plurality of streams at high velocity, injecting a plurality of streams of carbonaceous fuel at high velocity into said reaction zone, said high velocity streams being directed toward each other to mix and react over an extended area of contact under conditions of extreme turbulence, the amount of oxidizing gas being in excess of that required to convert all the carbon in the fuel to carbon monoxide and substantially less than that required to convert all the carbon to carbon dioxide, the amount of metal oxide being less than that theoretically reducible by the resulting synthesis gas, and recovering a reduced metal oxide and synthesis gas from said reaction zone.

2. The process set forth in claim 1 wherein said metal oxide is an oxide of iron.

3. The process set forth in claim 1 wherein said oxidizing gas contains in excess of 40% oxygen by volume.

4. The process set forth in claim 1 wherein said oxidizing gas is 95% oxygen.

5. The process set forth in claim 1 wherein said carbonaceous fuel is natural gas.

6. The process set forth in claim 1 wherein the ratio of oxygen to carbon in the fuel is about 1.0 to 1.5 times that required to convert all said carbon to carbon monoxide and the amount of synthesis gas generated is about 1.5 to 2 times that theoretically required to completely reduce the metal oxide.

7. The process set forth in claim 1 wherein the temperature of said reaction is in the range of about 1800–3500° F.

8. A process for preparing synthesis gas and reducing metal oxides comprising dispersing a powdered solid metal oxide in a stream of oxidizing gas containing at least 40% oxygen by volume, injecting said mixture into an unconfined reaction zone in a plurality of streams at high velocity, injecting a plurality of streams of preheated carbonaceous fuel at high velocity into said reaction zone, said high velocity streams being directed toward each other to mix and react over an extended area of contact under conditions of extreme turbulence and at a temperature in the range of about 1800–3500° F., the amount of said oxidizing gas being in excess of that required to convert all the carbon in the fuel to carbon monoxide and substantially less than that required to convert all the carbon to carbon dioxide, the amount of metal oxide being less than that theoretically reducible by the resulting synthesis gas, and recovering a reduced metal oxide and synthesis gas from said reaction zone.

9. A multistage process for preparing synthesis gas and reducing metal oxides comprising dispersing a powdered solid metal oxide in a stream of oxidizing gas, injecting said mixture into a first unconfined reaction zone in a plurality of streams at high velocity, injecting a plurality of streams of carbonaceous fuel at high velocity into said first reaction zone, removing a partially reduced metal oxide and synthesis gas from said first zone, dispersing said partially reduced metal oxide in a stream of transporting gas, injecting said mixture into a second unconfined reaction zone in a plurality of streams at high velocity, injecting a plurality of streams of carbonaceous fuel and of oxygen at high velocity into said second reaction zone, removing a further reduced metal oxide and synthesis gas from said second zone, dispersing said reduced oxide in a stream of transporting gas, injecting said mixture into a third unconfined reaction zone in a plurality of streams at high velocity, injecting a plurality of streams of carbonaceous fuel and of oxygen at high velocity into said third zone and recovering metal and synthesis gas therefrom, the high velocity streams in each of said zones being directed toward each other to mix and react over an extended area of contact under conditions of extreme turbulence, the amount of oxidizing gas in each of said zones being in excess of that required to convert all the carbon in the fuel in each said zone to carbon monoxide and substantially less than that required to convert all the carbon in the fuel in each said zone to carbon dioxide, the amount of metal oxide in each said zone being less than that theoretically reducible by the resulting synthesis gas in each zone.

10. The process set forth in claim 9 wherein said metal oxide is iron oxide.

11. A process for preparing synthesis gas and reducing metal oxides comprising injecting a powdered solid metal oxide, an oxidizing gas and a carbonaceous fuel into an unconfined reaction zone at high velocity, said high velocity reactants being directed toward each other to mix instantaneously over an extended area of contact and to react under conditions of extreme turbulence, whereby localized excesses of oxygen and corresponding localized excessive highly exothermic complete oxidation of said carbonaceous fuel are substantially eliminated, the amount of said oxidizing gas being in excess of that required to convert all the carbon in the fuel to carbon monoxide and substantially less than that required to convert all the carbon to carbon dioxide, the amount of metal oxide being less than that theoretically reducible by the resulting synthesis gas, and recovering a reduced metal oxide and synthesis gas from said reaction zone.

12. The process set forth in claim 11 wherein the temperature of said reaction is in the range of about 1800–3500° F.

13. The process set forth in claim 11 wherein said oxidizing gas is 95% oxygen and said carbonaceous fuel is natural gas.

14. The process set forth in claim 11 wherein the ratio of oxygen to carbon in the fuel is about 1.0 to 1.5 times that required to convert all said carbon to carbon monoxide and the amount of synthesis gas generated is about 1.5 to 2 times that theoretically required to completely reduce the metal oxide.

References Cited in the file of this patent

UNITED STATES PATENTS

| | | |
|---|---|---|
| 2,177,379 | Van Nuys | Oct. 24, 1939 |
| 2,577,730 | Benedict et al. | Dec. 11, 1951 |
| 2,702,240 | Rees et al. | Feb. 15, 1955 |
| 2,824,792 | Rees et al. | Feb. 25, 1958 |